(12) United States Patent
Nguyen

(10) Patent No.: US 6,249,111 B1
(45) Date of Patent: Jun. 19, 2001

(54) DUAL DRIVE BUCK REGULATOR

(75) Inventor: Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/602,163

(22) Filed: Jun. 22, 2000

(51) Int. Cl.$^7$ ................................................. G05F 1/40
(52) U.S. Cl. ................................................. 323/282
(58) Field of Search ............................ 323/265, 266, 323/268, 269, 273, 274, 282, 283, 284

(56) References Cited

U.S. PATENT DOCUMENTS

| | | | |
|---|---|---|---|
| 5,734,258 | * | 3/1998 | Esser ..................................... 323/224 |
| 5,959,442 | * | 9/1999 | Hallberg et al. ..................... 323/282 |
| 6,115,267 | * | 9/2000 | Herbert ................................. 363/25 |

\* cited by examiner

*Primary Examiner*—Matthew Nguyen

(74) *Attorney, Agent, or Firm*—Blakely, Sokoloff, Taylor & Zafman LLP

(57) ABSTRACT

A switching regulator of the step down variety is disclosed. First and second transistors coupled in parallel between a first supply node and a first output node are controlled by a driver stage to sequentially (1) switch on the first transistor, (2) switch on the second transistor, (3) switch off the second transistor, and (4) switch off the first transistor. The first transistor is smaller than the second transistor, such that the first transistor can switch faster than the second transistor, thereby reducing power dissipation during the time intervals in which both transistors are switching. Such a design allows an increase in switching frequency without the conventional increase in power dissipation, in return for a relatively inexpensive change of adding an additional, smaller transistor in parallel with a larger one, and associated circuitry in the driver stage.

21 Claims, 4 Drawing Sheets

DUAL DRIVE BUCK REGULATOR

FIELD OF THE INVENTION

This invention is generally related to switching, regulated power supplies, and more particularly to step down regulators.

BACKGROUND

Regulated power supplies are essential to any electronic system because they maintain a constant output voltage or current for changes in the input line voltage, output load, ambient temperature, or time. Switching, step down regulators are preferred over linear regulators in many instances, because of their greater power efficiency in converting a large input voltage into a significantly smaller output voltage, and because of their smaller size. These regulators, also referred to here as "buck" regulators, operate under closed loop control to alternately increase and decrease the current (at a frequency of several hundred kHz or higher) in an inductor of a low pass filter, to maintain a ripple-free, regulated, DC output voltage. Buck regulators are particularly desirable in portable, battery operated computing and communication devices such as high performance notebook computers which require small size as well as high power conversion efficiency in a voltage regulator. These devices may require a regulated output voltage of 1.6 Volts DC (to run the logic computing circuitry such as the core processor) from an input line voltage that can vary in the range of 5–21 Volts DC.

The inductor current in a buck regulator is controlled by operating a transistor which switches the inductor between a high voltage near one supply node (typically at a positive voltage) and a low voltage near another supply node (typically ground). Increasing this switching frequency allows the use of smaller size passive devices (inductors and capacitors) in the low pass filter, making the regulator fit more easily in the portable computing device, yet still achieve a ripple-free output voltage. However, increased switching frequency can reduce power conversion efficiency because a transistor is switching more often, and therefore dissipating more power, in the same interval of time. Reduced power conversion efficiency in a regulator is very undesirable, particularly in portable, battery operated devices.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

According to an embodiment of the invention, a switching regulator is disclosed which may allow an increase in the switching frequency without a reduction in power conversion efficiency that would be suffered in conventional buck regulators. The beneficial effect upon the power conversion efficiency may be explained by reduced power dissipation in the interval in which a transistor switches the inductor between a high voltage and a low voltage. More particularly, this reduction in the switching loss is obtained using a regulator design having two transistors coupled in parallel between a first supply node and a first output node. The first transistor is smaller than the second transistor, such that the first transistor can switch faster than the second transistor. A driver stage is coupled to control the first and second transistors, by sequentially (1) switching on the first transistor, (2) switching on the second transistor, (3) switching off the second transistor, and (4) switching off the first transistor. In this manner, the switching loss due to the switching of the larger transistor is reduced, because the inductor is already at the first supply node voltage when the larger transistor is switched on and remains at the first supply node voltage when the larger transistor is switched off. In contrast, with the conventional buck regulator design, the single, large transistor must switch from one supply node voltage to another during the relatively long switching interval that is associated with larger transistors. Thus, by using a smaller, faster switching transistor to raise/lower the inductor voltage before/after switching on/off the larger transistor reduces the switching loss in the ensuing transition of the larger transistor.

Once the larger transistor has been turned on, the inductor current will be steered through this larger device and may increase, by virtue of the lower on-resistance of the larger transistor as compared to the smaller transistor, thereby preventing increased power dissipation through the smaller, higher resistance transistor.

Figure 1:
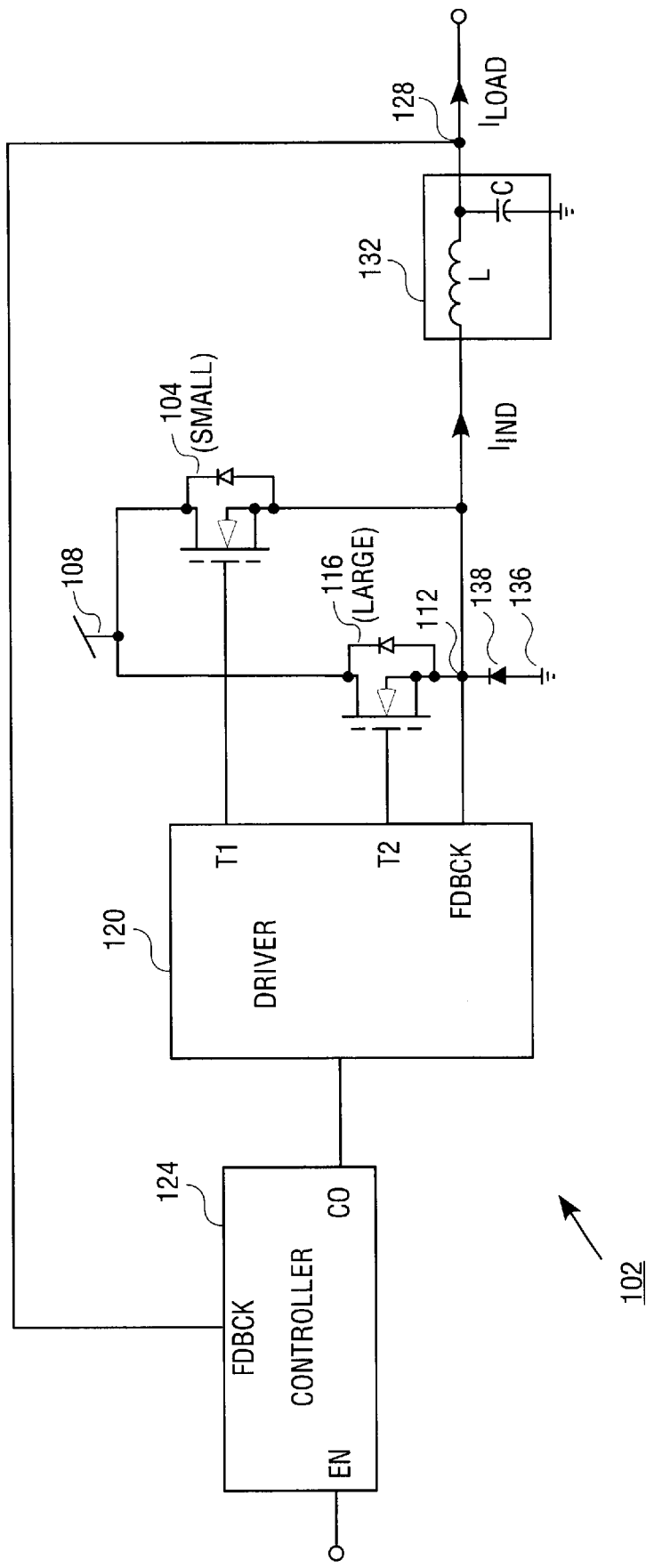
FIG. 1 shows a circuit diagram of a buck regulator according to an embodiment of the invention.

FIG. 1 shows a circuit diagram of a buck regulator 102 according to an embodiment of the invention. A smaller switching transistor 104 (in this case a N-channel enhancement mode metal oxide semiconductor field effect transistor (MOSFET)) is coupled between a first supply node 108 and a first output node 112. For this particular example, the first supply node 108 is at a positive voltage Vdc which may vary over a relatively wide range such as 5–21 volts. A second transistor 116 (in this case also an N-channel MOSFET) is coupled in parallel with the first transistor 104. Note that the first transistor 104 has smaller dimensions than the second transistor 116 such that the transistor 104 can switch the same voltage across its drain-source terminals faster than the second transistor. For instance, when switching the first output node 112 from 0 volts to Vdc, the smaller transistor 104 is able to increase the voltage at the first output node 112 much faster than the larger transistor 116, e.g. 5–6 nanoseconds versus 20–25 nanoseconds. A smaller transistor generally has a larger on-resistance than a larger transistor, such that for the same amount of current through both transistors, there is higher power dissipation in the smaller transistor.

A driver stage 120 is coupled to drive the control electrodes, in this case the gate electrodes, of the two transistors to sequentially (1) switch on the first transistor 104, (2) switch on the second transistor 116, (3) switch off the second transistor 116, and (4) switch off the first transistor 104. Such a sequence allows the voltage at the first output node 112 to be quickly switched from 0 volts (or other relatively low voltage) to essentially Vdc prior to turning on the larger transistor 116. The larger transistor, once turned on, will cause almost all of the current from the first supply node 108 to the first output node 112 to be steered through itself rather than the smaller first transistor 104.

To provide a substantially ripple-free DC voltage at a second output node 128, an inductor-capacitor (LC) low pass filter 132 is coupled between the first output node 112 and either the first supply node 108 or a second supply node 136 (here, ground). Note that although a single LC pair is shown for the low pass filter 132, in general a wide range of low pass filter designs including multiple LC pairs may be used depending on the amount of ripple that may be tolerated at the output node 128, the switching frequency of the driver stage outputs, and the amount of space available. A diode 138 is also coupled between the second supply node 136 and the first output node 112. This diode prevents the inductor current Iind of the low pass filter 136 from stopping abruptly when both the first and second transistors 104 and 116 have been turned off.

Figure 2:
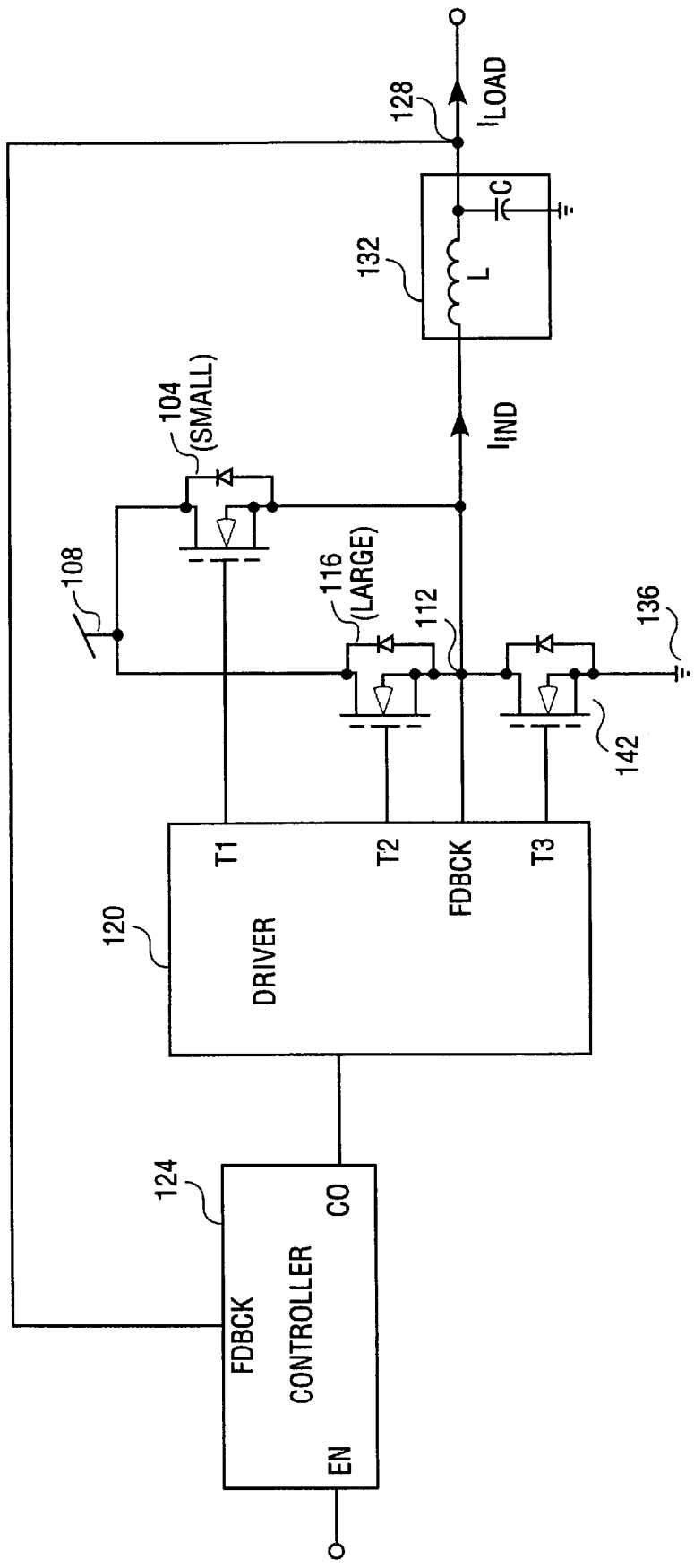
FIG. 2 depicts a circuit diagram of the buck regulator according to another embodiment of the invention.

To help reduce power consumption during the interval in which the inductor current Iind is being sourced from the second supply node 136, a third transistor 142 may be coupled as shown in the embodiment of FIG. 2, between the second supply node 136 and the first output node 112. Use of such a transistor (which may include a parasitic body diode as shown) helps reduce power dissipation as compared to using just the diode 138 in the embodiment of FIG. 1, because of the lower on-resistance of the transistor 142 and its faster switching characteristics as compared to the diode 138. When operating the third transistor 142, the driver stage 120 is further configured with a T3 output to (1) switch off the third transistor 142 before switching on the first transistor 104 or the second transistor 116, and (2) switch on the third transistor 142 after switching off the first and second transistors to avoid shorting the first and second power supply nodes.

The switching regulator embodiments described above may further include a conventional voltage regulator controller 124 coupled to the driver stage 120 to regulate the DC voltage at the second output node 128 based on a feedback signal received at FDBCK, so that the regulated voltage at the second output node 128 is smaller in magnitude than the voltage on the first supply node 108. This regulation may be achieved by feeding the driver stage 120 a pulse-with-modulated (PWM) signal at the CO output which regulates the voltage by instructing the driver stage to turn on and turn off (pulse) the transistors to thereby increase or decrease the current in the inductor of the low pass filter 132 to achieve the desired voltage at the node 128. The sequence of operations for turning on and turning off the transistors described above in FIG. 2 will be further illustrated below in connection with the timing diagram of FIG. 3.

Figure 3:
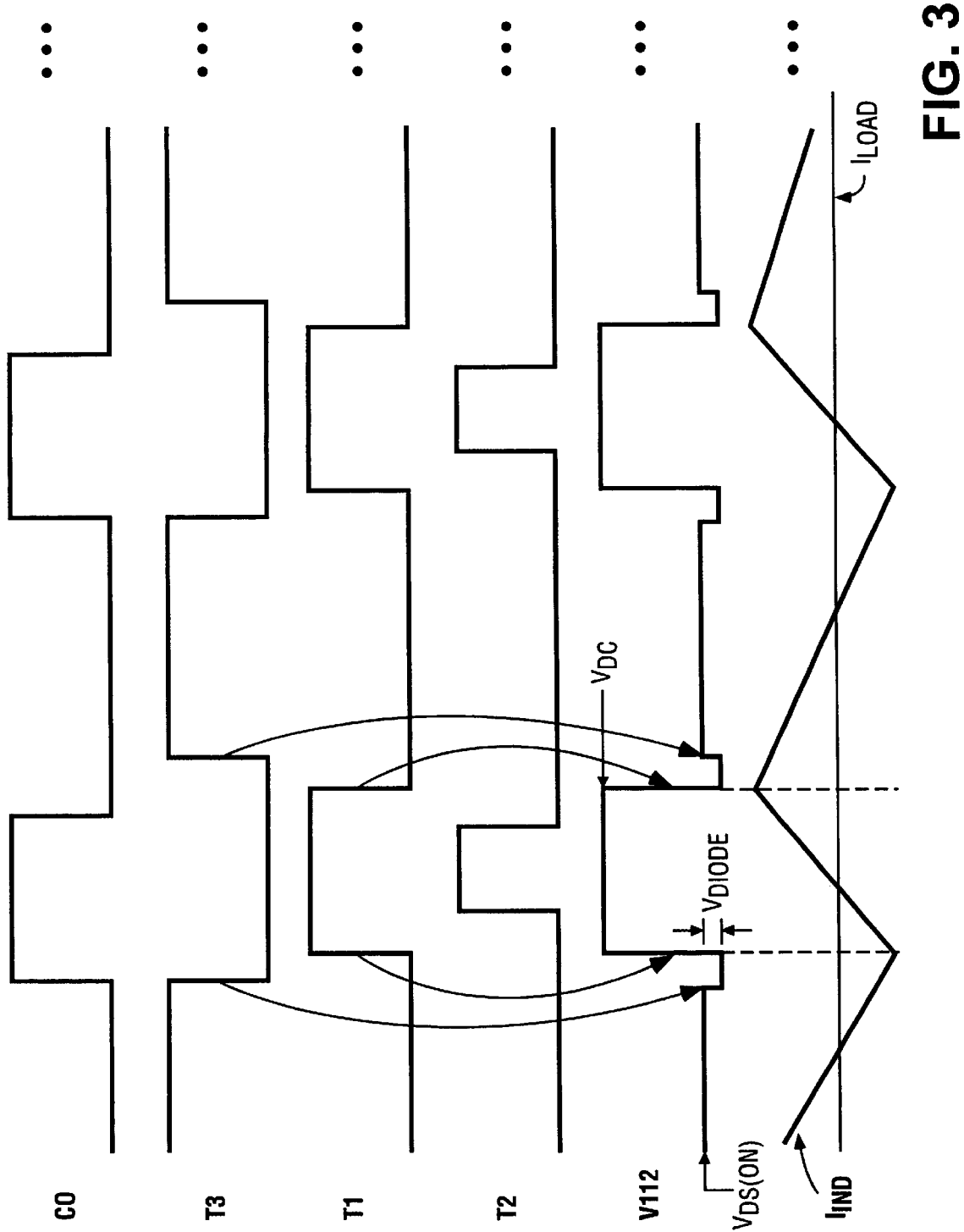
FIG. 3 illustrates a timing diagram of an exemplary set of signals in the buck regulator of FIG. 2.

Turning now to the timing diagram of FIG. 3, what is shown are waveforms for the following signals: controller output (CO), transistor control pulse signals T1–T3, first output node voltage V112, inductor current Iind, and load current Iload. These signals may be obtained at the circuit locations indicated in FIG. 2. The CO signal is a sequence of pulses generated by the controller 124 and provided to the driver stage 120. In response to each CO pulse, the driver stage 120 deasserts the third pulse signal T3 such that the transistor 142 is turned off. Thereafter, transistors 104 and 116 are turned on in that order, by asserting the first and second pulse signals T1 and T2. The effect on the first output node voltage V112 may be described as shown in FIG. 3, where, when the third pulse signal T3 is deasserted, V112 drops from its drain to source unsaturated voltage Vds (on) by a single diode voltage drop Vdiode, where Vdiode corresponds to the voltage drop across the parasitic body diode of the transistor 142 shown in FIG. 2. Similarly, V112 rises back to its Vds (on) value when the T3 signal is asserted. In between the times when T3 is deasserted and asserted, the first and second pulse signals T1 and T2 are asserted sequentially, the asserting of T1 produces a relatively large increase in V112, preferably to a voltage as close as possible to that of the first supply node 108 (here Vdc, a positive value). It may be expected that there is no appreciable effect on V12 when T2 is subsequently asserted. The assertion of T2 is expected to steer the inductor current from the smaller transistor 104 into the larger transistor 116 as well as provide a lower impedance path through the larger transistor for the inductor current, without affecting V112.

The effect of pulsing the transistors as described above on the inductor current Iind is shown in FIG. 3 as a type of triangular shape having an average value represented by Iload, a DC value. Note that Iind decreases while T1 and T2 remain deasserted, and increases as soon as T1 is asserted. It may be expected that the sequencing of T1 and T2 in this manner does not substantially change the rate of increase of Iind as compared to a conventional regulator design without the small transistor, because the rate of increase of Iind is proportional to the inductance value L (which remains essentially fixed in most applications) and V112 which, as may be expected and mentioned above, does not substantially change during the interval in which T1 is asserted and T2 is pulsed.

The sequence described above, beginning with CO being asserted and ending with T3 being asserted, is repeated according to a frequency determined by the controller 124 so that a voltage at the second output node 128 of the low pass filter 132 (see FIG. 2) is regulated to a predetermined, substantially ripple-free DC value which is smaller in magnitude than an unregulated voltage of the first supply node 108 (when referenced to the second supply node 136). For the particular embodiment of the invention whose waveforms are illustrated in FIG. 3, CO may be characterized as a pulse-with-modulated (PWM) signal whose pulse width is modulated in response to the feedback signal received at the FDBCK input of the controller 124 (see FIG. 2).

Figure 4:
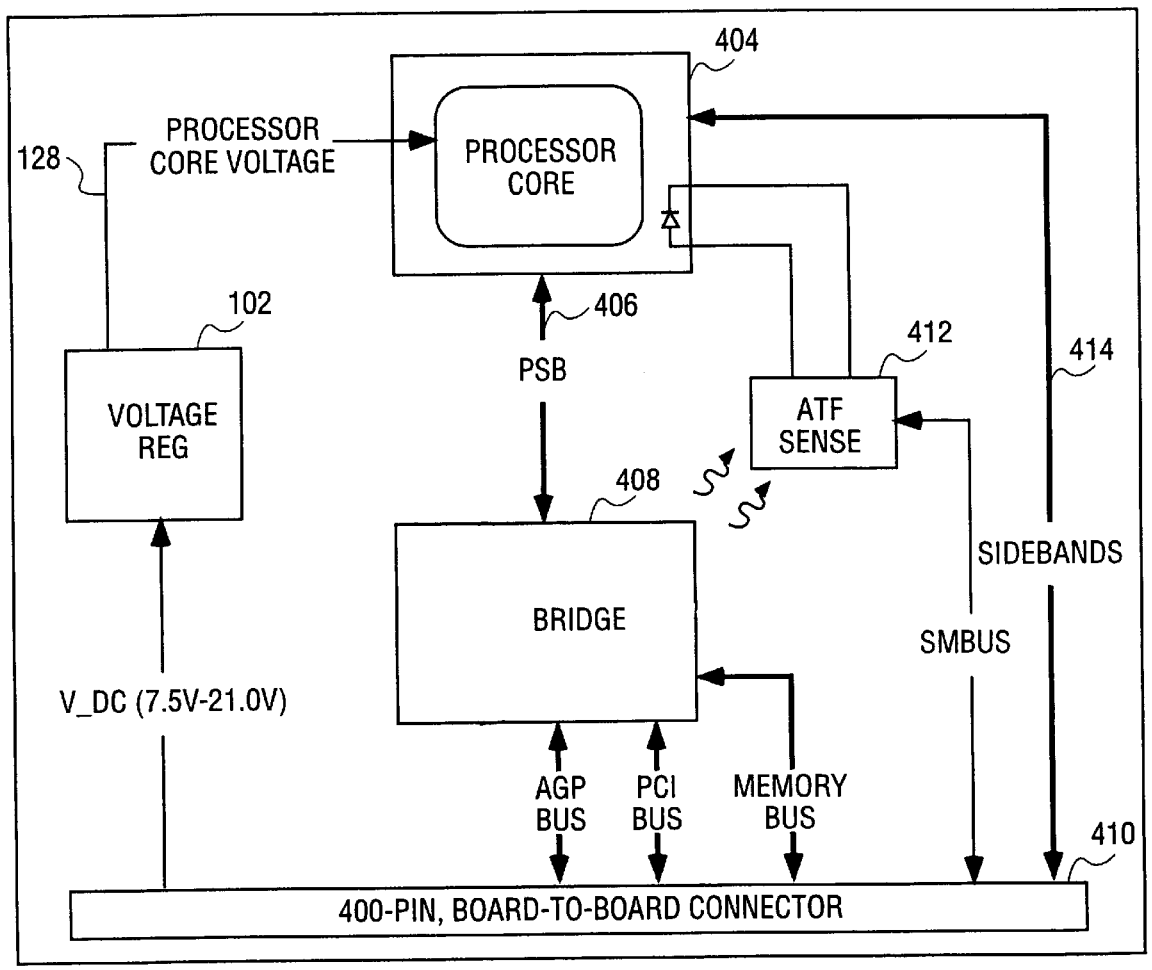
FIG. 4 shows a block diagram of a core processor mobile module featuring the buck regulator.

FIG. 4 shows a block diagram of a core processor mobile module featuring the voltage regulator 102. The mobile module 402 is a printed wiring board assembly that contains the voltage regulator 102 which receives an input voltage in the range 7.5 volts to 21 volts dc and in response provides a regulated, ripple-free dc processor core voltage of 1.8 volts or less at node 128. A processor 404 which includes a processor core, such as a Celeron™ brand processor by Intel Corp., is provided on the module 402. The highly integrated mobile module contains a processor system bus (PSB) which allows the processor to communicate with a bridge chip set 408. The bridge chip set 408 includes a peripheral components interconnect (PCI) bridge as well as a host bridge. The bridge chip set 408 communicates with devices that are not on the mobile module through a board-to-board connector 410 that provides connections to a memory bus, a PCI bus, and an accelerated graphics port (AGP) bus which provides a dedicated, high speed port for the movement of large blocks of graphics data. The mobile module 402 also features an active thermal feedback (ATF) sensor 412 which provides digital-type thermal sensing. Power management is accomplished via a system management bus (SMBus) path through the connector 410, for managing the power consumption of the module 402. Finally, a sideband bus 414 is provided as an additional conduit for address and commands between the processor 404 and devices connected to the PCI bus that are not on the mobile module 402. It may be expected that such a mobile module 402 would dissipate approximately 15 watts of power which the voltage regulator 102 would be designed to provide.

To summarize, a step down voltage regulator is disclosed which uses a pair of transistors that are switched on sequentially and repeatedly, to regulate the output voltage. The two transistors are connected in parallel. The first transistor is smaller than the second transistor so that the first transistor can switch faster than the second transistor. Power dissipation is reduced during the switching intervals by not switching the larger (slower) transistor until its drain-source voltage has been reduced to essentially zero. Since the second transistor is larger, the second transistor provides a lower impedance than the first transistor so that power dissipation is also reduced during the non-switching time interval in which a relatively large amount of output current is being provided by the second transistor.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A switching regulator comprising:
   a first transistor coupled between a first supply node and a first output node;
   a second transistor coupled in parallel with the first transistor, the first transistor being smaller than the second transistor; and
   a driver stage coupled to the first and second transistors to sequentially (1) switch on the first transistor, (2) switch on the second transistor, (3) switch off the second transistor, and (4) switch off the first transistor.

2. The switching regulator of claim 1 further comprising:
   a diode coupled between a second supply node and the first output node; and
   an inductor-capacitor low pass filter coupled between the first output node and one of the first and second supply nodes, to provide a substantially ripple-free voltage at a second output node.

3. The switching regulator of claim 1 further comprising:
   a third transistor coupled between a second supply node and the first output node, wherein the driver stage is further coupled to the third transistor to (1) switch off the third transistor before switching on the first transistor, and (2) switch on the third transistor after switching off the first transistor.

4. The switching regulator of claim 2 further comprising:
   a controller coupled to the driver stage to regulate the voltage at the second output node which is smaller in magnitude than a voltage of the first supply node.

5. The switching regulator of claim 4 wherein the controller is to feed the driver stage a pulse-width-modulated (PWM) signal to regulate the voltage at the second output node.

6. The switching regulator of claim 3 wherein the driver stage is configured to (1) switch off the third transistor in response to the PWM signal being asserted, and (2) switch on the third transistor after the PWM signal is deasserted.

7. The switching regulator of claim 1 wherein the second transistor is sized to provide a lower impedance than the first transistor.

8. The switching regulator of claim 1 wherein the first transistor is sized to switch faster than the second transistor.

9. A switching regulator comprising:
   first switch means for selectively providing a first low impedance path between a first supply node and a first output node;
   second switch means for selectively providing a second low impedance path in parallel with the first path, the second path having a lower impedance than the first path; and
   means for driving the first and second switch means to sequentially (1) open the first path, (2) open the second path, (3) block the second path, and (4) block the first path.

10. The switching regulator of claim 9 further comprising:
    a diode coupled between a second supply node and the first output node; and
    an inductor-capacitor low pass filter coupled between the first output node and one of the first and second supply nodes, to provide a substantially ripple-free voltage at a second output node.

11. The switching regulator of claim 9 further comprising:
    third switch means for selectively providing a third low impedance path between a second supply node and the first output node; and
    means for driving the third switch means to (1) block the third path before opening the first path, and (2) open the third path after blocking the first path.

12. The switching regulator of claim 10 further comprising:
    means for controlling the driving means to regulate the voltage at the second output node which is smaller in magnitude than a voltage of the first supply node.

13. The switching regulator of claim 12 wherein the controller means feeds the driver means a pulse-width-modulated (PWM) signal to regulate the voltage at the second output node.

14. The switching regulator of claim 13 wherein the driving means (1) blocks the third path in response to the PWM signal being asserted, and (2) opens the third path after the PWM signal is deasserted.

15. A method comprising:
    (a) asserting a first pulse signal to a control electrode of a first transistor coupled between a first supply node and a first output node; and then
    (b) asserting a second pulse signal to a control electrode of a second transistor that is coupled in parallel with the first transistor, the first transistor being smaller than the second transistor; and then
    (c) deasserting the second pulse signal; and then
    (d) deasserting the first pulse signal; and then
    (e) repeating (a)–(d) to regulate a voltage at an output node of an inductor-capacitor low pass filter that is coupled to the first output node.

16. The method of claim 15 further comprising:
    deasserting a third pulse signal to a control electrode of a third transistor coupled between a second supply node and the first output node, before asserting the first pulse signal; and
    asserting the third pulse signal after deasserting the first pulse signal.

17. The method of claim 15 wherein the second pulse signal is asserted in response to sensing that a voltage of the first output node has reached a level close to a voltage of the first supply node.

18. A mobile module comprising:

a printed wiring board having a board-to-board connector;

a processor assembly containing a processor core and mounted to the board;

a bridge chip set coupled to the processor assembly by a system bus and to the board-to-board connector through a plurality of buses; and a voltage regulator having a first supply node coupled to receive an input unregulated dc voltage from a terminal in the board-to-board connector and an output to provide a regulated dc processor core voltage, the regulator having a first transistor coupled between the first supply node and a first output node, a second transistor coupled in parallel with the first transistor, the first transistor being smaller than the second transistor, and a driver stage coupled to the first and second transistors to sequentially (1) switch on the first transistor, (2) switch on the second transistor, (3) switch off the second transistor, and (4) switch off the first transistor.

19. The mobile module of claim 18 further comprising a thermal feedback sensor mounted to the board to provide digital thermal sensing of the mobile module and being communicatively coupled to the board-to-board connector.

20. The mobile module of claim 18 further comprising a sideband bus to provide address and command communication between the processor assembly and the board-to-board connector.

21. The mobile module of claim 18 wherein the voltage regulator further includes a diode coupled between a second supply node and the first output node, and an inductor-capacitor low pass filter coupled between the first output node and one of the first and second supply nodes, to provide a substantially ripple-free voltage at the output of the regulator.

* * * * *